US011876604B2

(12) United States Patent
Jensen et al.

(10) Patent No.: US 11,876,604 B2
(45) Date of Patent: Jan. 16, 2024

(54) SYSTEM AND METHOD TO MANAGE STREAMING VIDEO CONTENT

(71) Applicants:Joshua Jensen, Brownville, NY (US); Christopher Hopper, Depauville, NY (US)

(72) Inventors: Joshua Jensen, Brownville, NY (US); Christopher Hopper, Depauville, NY (US)

( * ) Notice: Subject to any disclaimer, the term of this patent is extended or adjusted under 35 U.S.C. 154(b) by 640 days.

(21) Appl. No.: 15/912,619

(22) Filed: Mar. 6, 2018

(65) Prior Publication Data

US 2019/0280792 A1 Sep. 12, 2019

(51) Int. Cl.
*H04N 21/47* (2011.01)
*H04H 60/21* (2008.01)
*G06Q 20/06* (2012.01)
*G06Q 20/40* (2012.01)
*G06F 3/04817* (2022.01)
*G06F 3/04883* (2022.01)

(52) U.S. Cl.
CPC ......... *H04H 60/21* (2013.01); *G06F 3/04817* (2013.01); *G06F 3/04883* (2013.01); *G06Q 20/0655* (2013.01); *G06Q 20/4014* (2013.01)

(58) Field of Classification Search
CPC ............ G06Q 20/0655; G06Q 20/4014; G06F 3/04817; G06F 3/04883; H04H 60/21
USPC .......................................................... 725/5
See application file for complete search history.

(56) References Cited

U.S. PATENT DOCUMENTS

| 4,390,898 | A | * | 6/1983 | Bond | H04N 5/913 348/E7.055 |
| 4,695,903 | A | * | 9/1987 | Serap | G07F 17/28 360/55 |
| 5,557,675 | A | * | 9/1996 | Schupak | H04N 7/163 348/552 |
| 2002/0011990 | A1 | * | 1/2002 | Anwar | G06F 3/1203 345/173 |
| 2002/0138826 | A1 | * | 9/2002 | Peterka | H04L 12/185 725/1 |
| 2002/0169724 | A1 | * | 11/2002 | Moroney | G06Q 30/018 705/52 |
| 2002/0191029 | A1 | * | 12/2002 | Gillespie | G06F 3/0481 715/810 |

(Continued)

OTHER PUBLICATIONS

A. Martinez-Balleste, J. Domingo-Ferrer and F. Sebe, "MINPAY: a multi-device Internet pay-as-you-watch system," Proceedings ITCC 2003. International Conference on Information Technology: Coding and Computing, Las Vegas, NV, USA, 2003, pp. 258-262, doi: 10.1109/ITCC.2003.1197537. (Year: 2003).*

*Primary Examiner* — Cynthia M Fogg
(74) *Attorney, Agent, or Firm* — Patrick J Stanzione; Stanzione & Associates, PLLC

(57) ABSTRACT

A system and method to provide streaming video content to a screen of a smart electronic device in non-viewable form until a user agrees to view the video in exchange for an incremental amount of currency, at which time the streaming video content becomes viewable in pre-determined increments of time pre-paid for by the user of the smart device by interacting with the screen. The user can determine through the screen how many increments of viewable streaming of video content are desired to be purchased and viewed by interacting with the screen in a pre-determined way each time the streaming video content becomes non-viewable.

35 Claims, 11 Drawing Sheets

(56) References Cited

U.S. PATENT DOCUMENTS

| | | | | |
|---|---|---|---|---|
| 2004/0260669 | A1* | 12/2004 | Fernandez | H04N 5/2621 |
| 2005/0120125 | A1* | 6/2005 | Morten | G06F 21/10 |
| | | | | 709/231 |
| 2006/0064700 | A1* | 3/2006 | Ludvig | H04N 21/4424 |
| | | | | 719/318 |
| 2007/0100757 | A1* | 5/2007 | Rhoads | G06F 21/10 |
| | | | | 705/51 |
| 2007/0150340 | A1* | 6/2007 | Cartmell | G06Q 10/10 |
| | | | | 705/14.55 |
| 2008/0077950 | A1* | 3/2008 | Burke | H04N 21/25435 |
| | | | | 348/E7.071 |
| 2009/0034604 | A1* | 2/2009 | Delia | G11B 27/034 |
| | | | | 375/240.01 |
| 2009/0254930 | A1* | 10/2009 | Lo | G06Q 30/02 |
| | | | | 725/2 |
| 2010/0185547 | A1* | 7/2010 | Scholar | G06Q 10/06 |
| | | | | 705/80 |
| 2012/0023453 | A1* | 1/2012 | Wagner | G06F 3/04886 |
| | | | | 715/848 |
| 2012/0124389 | A1* | 5/2012 | Villani | G06F 21/6245 |
| | | | | 713/189 |
| 2012/0284427 | A1* | 11/2012 | Dods | H04W 88/00 |
| | | | | 710/3 |
| 2015/0039989 | A1* | 2/2015 | Dhanawat | G06F 17/243 |
| | | | | 715/226 |
| 2016/0239186 | A1* | 8/2016 | Skripkin | G06T 11/60 |
| 2017/0337600 | A1* | 11/2017 | Karanth | G06Q 30/0601 |
| 2019/0114603 | A1* | 4/2019 | Sharma | H04N 21/44204 |

\* cited by examiner

SYSTEM AND METHOD TO MANAGE STREAMING VIDEO CONTENT

TECHNICAL FIELD

The invention pertains to the field of peer-to-peer and server-to-peer streaming of video content. More particularly, the invention pertains to peer-to-peer and server-to-peer streaming of video content through continual user interaction and monetization of increments of the streaming video content for selective viewing.

BACKGROUND

Currently, streaming video content is monetized through either subscriptions to particular video provider/host services, such as television channels or individual video providers/hosts, or through advertising, such as pre-video or in-video content. However, such video providers/hosts require either yearly or monthly membership subscriptions at a set cost, or require paying full cost for an entire video, regardless of whether the entire video is desired to be viewed by a customer (hereinafter referred to as an end-user or user). Such providers/hosts include, for example, YouTube , Facebook Live®, Twitter Live®, Instagram® and Periscope®.

Mobile social media in its current form provides the ability of allowing end-users to receive and view video content on a mobile device through monetary means, such as purchasing host services by way of yearly subscriptions or monthly subscriptions, or by paying a certain determinate fee for viewing an entire streaming video, regardless whether the entire video is desired to be purchased and viewed. In other words, users with mobile devices are required to purchase streaming video content without knowing whether they will like the video and whether they would like to view the entire video content. Users, therefore, must pay for the entire video content regardless of the user's interest in viewing the video.

An example of a current video streaming service is YouTube®. This service requires two different levels of viewing streaming video content. The first option includes less desirable video content and is free to a user to view. However, a plurality of commercials infiltrate the free video content throughout the streaming video. The second option requires paying a fee for a membership that allows the user to view more desirable streaming video content. This fee is a set monthly or yearly fee the user must pay regardless whether or not the user has the opportunity to view the desirable streaming video. Even if the user does have an opportunity to view some of the more desirable streaming video, the user most likely will not be able to view enough streaming video to make up the cost of the routine membership fee.

Another example is Periscope®. This service provides anyone the ability to broadcast a live streaming video through its data platform for free. However, a producer of a streaming video has no way to monetize the video.

None of these services provide a streaming video content platform where a user can determine how much he/she would like to pay for streaming video content, and only pay for a portion of a streaming video that is desired to be viewed.

None of these services provide a streaming video content platform where organizations, such as schools, for example, can incorporate into an easy-to-use video player an option to charge students to watch a play, a concert, etc., or portions thereof.

SUMMARY OF INVENTION

The foregoing and/or other features of the present inventive concept are achieved by providing a system to monetize increments of streaming video content for viewing on a screen of a smart electronic device, the system including: a user interface accessible by a smart device through a network for viewing streaming video content; and a server configured to exchange tokens for currency with users of a smart electronic device through the user interface, to provide streaming video content through the user interface in a non-viewable state, to repeal the non-viewable state of the streaming video content for each user accessing the streaming video content for a pre-determined increment of time in exchange for each token purchased by the user, the repealing of the non-viewable state of the streaming video content for the pre-determined increment of time being restarted each time a screen of the smart electronic device is interacted with.

According to an example embodiment of the present inventive concept, the pre-determined way of interacting with the screen is by tapping the screen.

According to an example embodiment of the present inventive concept, the pre-determined way of interacting with the screen is by swiping across the screen.

According to an example embodiment of the present inventive concept, the non-viewable state is a blurred state.

According to an example embodiment of the present inventive concept, the non-viewable state is an obscured state.

According to an example embodiment of the present inventive concept, the network can be wireless.

According to another example embodiment of the present inventive concept, the smart device can be a mobile device.

According to yet another example embodiment of the present inventive concept, the server can be further configured to: generate a service screen on the user interface which the user can select to view and enter information through on an interactive screen of the smart electronic device to purchase a desired number of tokens usable to repeal the non-viewable state of the accessed streaming video content; and generate a virtual keyboard with the service screen when the screen is interacted with to enter the information.

According to still another example embodiment of the present inventive concept, the server can be further configured to: generate a token screen selectable on the user interface, the token screen including a plurality of touch icons each providing a different number of tokens that can be selected by the user in exchange for a predetermined amount of currency.

According to still another example embodiment of the present inventive concept, the server can be further configured to: generate a membership screen which the user can select to view and enter information, the information enterable including personal identification (ID) information and financial account information required to purchase the tokens; and display the virtual keyboard with the membership screen when the touch-screen is tapped, the keyboard usable to enter the ID and credit card information.

The foregoing and/or other features of the present inventive concept are achieved by providing a the method including: generating a user interface accessible by the smart electronic device through a network for viewing streaming video content; and streaming video content through the user interface in a non-viewable state; repealing the non-viewable state of the streaming video content for each user accessing the streaming video content for a pre-determined increment of time in exchange for a token from the user as a result of the user interacting with the screen.

According to an example embodiment of the present inventive concept, the method may further include generating a service screen on the user interface selectable by the user to view and enter information through on a screen of the smart device to purchase a desired number of tokens usable to repeal the non-viewable state of the accessed streaming video content; and generating a virtual keyboard with the service screen when the screen is interacted with to enter the information.

According to another example embodiment of the present inventive concept, the method may further include generating a token screen selectable on the user interface, the token screen including a plurality of icons each providing a different number of tokens that can be selected by the user in exchange for a predetermined amount of currency.

According to another example embodiment of the present inventive concept, the method may further include generating a keyboard together with the membership screen when the screen is interacted with, the keyboard usable to enter the ID and financial data information required to purchase the tokens.

The foregoing and/or other features of the present inventive concept are also achieved by providing a streaming video content control system, including: a user interface accessible by a smart device through a network for viewing streaming video content; and a server configured to generate a set of interface windows through the user interface to allow a user to open an account, to deposit currency in the account from a financial account of the user, to dedicate a number of tokens to the user based on the amount of deposited currency, to deduct a predetermined number of the tokens from the user's account each time the user requests to view an increment of streaming video content from a video among a plurality of videos, and to provide viewable streaming video content to the user for the increment of time.

According to an example embodiment of the present inventive concept, the server can control the amount of streaming video content to be viewed by providing a clear view of the streaming video content requested through the user interface for increments of time corresponding to a time set to be equal to the value of the predetermined number of tokens deducted from the user and then blocks the streaming video content until the user requests to view another increment of the streaming video.

According to still example embodiment of the present inventive concept, the server can determine when the user requests to view an increment of streaming video content by sensing when the screen is interacted with.

According to still example embodiment of the present inventive concept, the server can determine when the screen is interacted with when the screen of the mobile device is tapped.

According to yet example embodiment of the present inventive concept, the server repeals the non-viewable state of the streaming video content as a result of the server sensing a swipe on the screen of the smart electronic device.

DETAILED DESCRIPTION OF EMBODIMENTS

Figure 1:
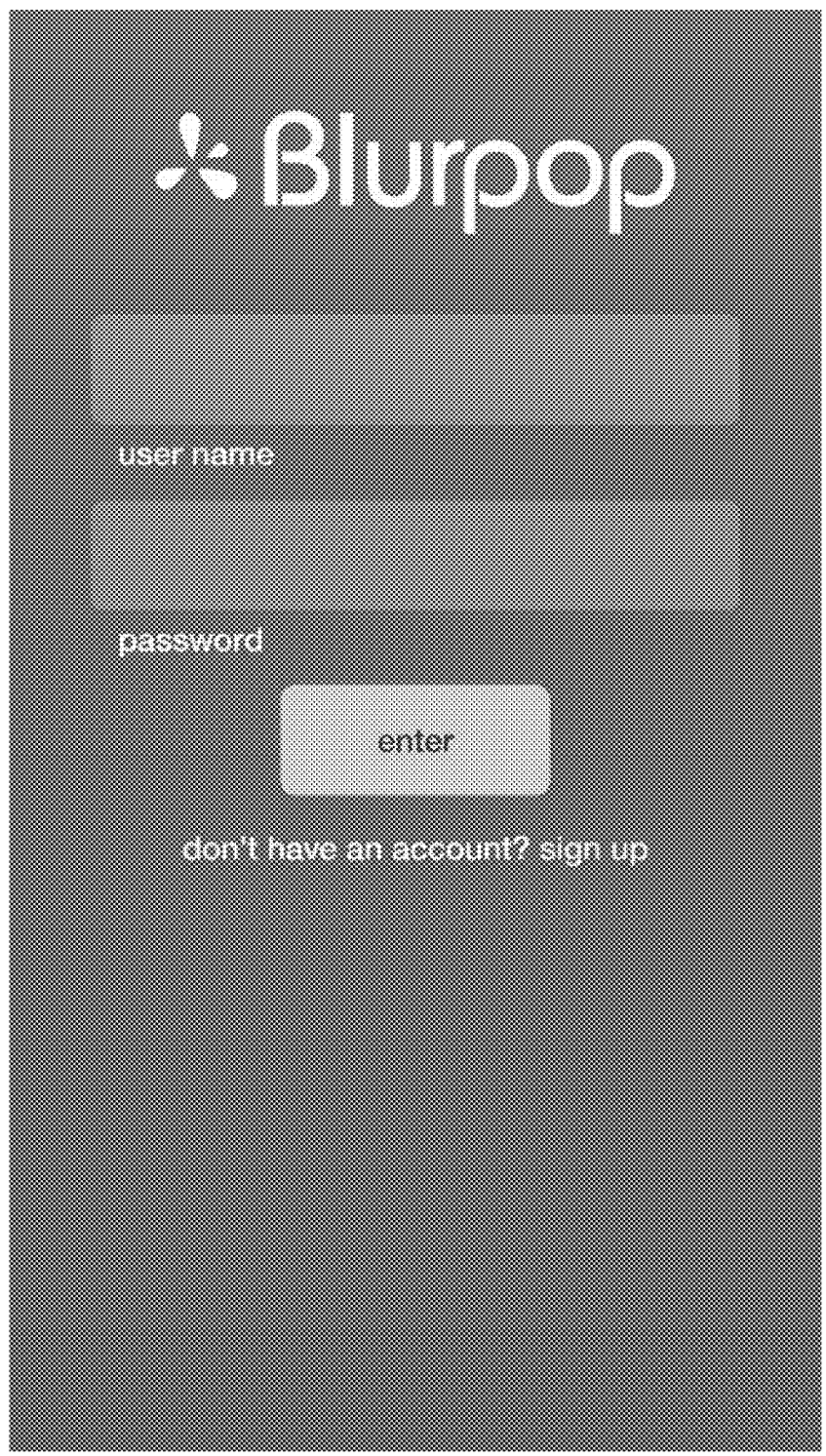
FIG. 1 illustrates an interactive screen to sign in or obtain an account with the streaming video content control system according to exemplary embodiments of the present inventive concept.

Example embodiments of the present inventive concept include a system and method to establish a peer-to-peer connection between a producer of live or pre-recorded streaming video content at a producer's device (i.e., a smart electronic device with a camera, such as a smart mobile device; a webcam; or any smart device that can produce a live video) and an end-user such that the end-user can receive and view the streaming video content by way of a smart electronic device, such as, for example a mobile electronic device that utilizes built-in cameras, a desktop computer with a browser, or any other smart device that can access streaming video and interact with a user interface of the system. The producer can provide live streaming video content to the system to be accessed by an end-user through the system's user interface for viewing the streaming video content and interacting with the user interface generated by the system according the embodiments described herein.

Example embodiments of the present inventive concept also include a system and method to establish a server-to-peer connection between a server of a streaming video content control system that provides live streaming video content as well as produces pre-recorded streaming video content and an end-user, such that the end-user can receive and view live and pre-recorded streaming video content by way of a smart electronic device. As pointed out above, the smart electronic device can include, for example a mobile electronic device that utilizes built-in cameras, a desktop computer with a browser, or any other smart device that can access streaming video and interact with a user interface of the system. The server of the streaming video content control system is also referred to as a host, and the terms host and server are interchangeable throughout the specification.

As pointed out above, the types of smart electronic devices that can be used by an end-user to access a user interface provided by the server and interact with the user interface, and can receive and view live and pre-recorded streaming video content from a producer and server as described above, can include, for example, smart mobile phones, laptop computers, desk top computers, video capable displays having features capable of controlling the system's services via a remote control device. However, the devices that can receive and view live and pre-recorded streaming video content provided by the streaming video content control system as described herein are not limited to these devices, and can be any streaming video receiving device that can interact with the user interface that provides the streaming video content provided by the system. Thus, when live streaming video content provided by a producer is sent to the server of the system, which then allows access of the live streaming video content through the user interface generated by the server of the system.

Embodiments of the present inventive concept also include interactive services through the server generated user interface to allow the end-user to control an amount of streaming video content to be viewed, and as a result allow the end-user to also control the amount the end-user is willing to pay for the streaming video content currently being viewed. In other words, the end-user can decide to continue to view more of the streaming video content or to terminate viewing the streaming video content, and therefore only pay for a portion of the streaming video content commensurate with the amount desired to be viewed. Therefore, the end-user can view incremental amounts of streaming video content and pay for only those incremental amounts of video content viewed, instead of being required to pay for the entire video content or to pay for more video content than the end-user desires. The end-user can also view streaming video content without being obligated to pay for a monthly or yearly membership fee. Further, the end-user can decide to terminate the streaming video content being presently viewed and choose another streaming video content.

An embodiment of the present inventive concept provides the following streaming video content control system to control the viewing ability of a streaming video content in increments, which are paid for per increment by an end-user. According to example embodiments as disclosed herein, a broadcasted streaming video content provided by a producer of the video content (through the streaming video content control system) or by the host server of the streaming video content control system is configured to be received through a user interface generated by a server of the streaming video content control system. This streaming video content can be originally provided via the server while being controlled to be non-viewable. However, the end-user can simply interact with a viewing screen of the user's smart device to instantly enable the end-user to view as much of the streaming video as desired. Interacting with the viewing screen will depend on the specific smart electronic device being used, which can include engaging a touch screen by tapping or swiping, clicking a remote control of a TV, voice activation, etc.

According to example embodiments, the streaming video content can be rendered non-viewable by the server by, for example, blurring the streaming video content or by obscuring the streaming video content. The streaming video content can be obscured by, for example placing an advertisement over the broadcasting/streaming video content, so that the video content is not viewable. However, the present inventive concept is not limited thereto, and other forms rendering the streaming video content non-viewable that provide the intended purposes may be provided by the server.

According to other example embodiments, the server can enable the end-user to interact with the smart electronic device viewing screen to enable viewing as much of the streaming video as desired. For example, when a touch-screen of a mobile device is being used, receiving a tap on the touch-screen or receiving a swipe on the touch-screen will enable viewing as much of the streaming video content as desired. However, the present inventive concept is not limited thereto, and other forms of enabling the end-user to engage a smart electronic device to enable viewing may be provided by the server.

In another example embodiment, the streaming video content can be rendered non-viewable after a predetermined incremental amount of time, or for a time as pre-set by a producer of the streaming video, and the non-viewable state can be instantly repealed for the predetermined incremental amount of time each time there is an interaction with the end-user's viewing screen, depending on the type of smart electronic device being used.

Further, the audio corresponding with the streaming video content can optionally be configured to be faded out when the viewing screen is rendered non-viewable, or the audio can be changed to correspond with the non-viewable material, such as an advertisement. As a result, the end-user is only required to pay for a desired amount of the streaming video content to be viewed. In other words, the broadcasted streaming video content is configured to be rendered non-viewable after a predetermined amount of time, and if the screen of an end-user's smart device screen in interacted with, the non-viewable state is repealed for another incremental amount of time so that the continuously streaming video content is instantly made clear again for viewing. Accordingly, each interaction with the smart electronic device's screen results in a mutually agreed-upon monetary micro-transaction between the streaming video content control system and the user that desires to view the currently streaming video content. Each interaction with the screen initiates the micro-transaction such that a token form of currency can be deducted from the user's account and the desired incremental amount of the streaming video content is viewable. It is to be noted that additional alternative ways to initiate another incremental amount of viewable streaming content, such as sensing a key word via speech recognition, or a menu selection in a portion of a viewing screen, etc., can be implemented. Various other known or later developed actions to interface with a streaming video content displaying device can be used without varying from the intended purposes of the present inventive concept as described above.

In another example embodiment, the server of the streaming video content control system can generate a control interface to be displayed at the producer's end, which allows the producer of the streaming video content to render the streaming video content non-viewable on demand, while stopping the charge to the user's account (i.e., stop collecting tokens). At this point the producer can require acceptance by the end-user of a higher amount of currency (i.e., tokens) to be deducted from the end-user's account per increment of viewing of the streaming video content. For example, if the streaming video is leading up to a big event, the host/producer can render the streaming video content non-viewable by touching a virtual button on the control interface, and require the end-user to spend a different amount of tokens per increment of viewing to view the big event.

As a result of providing end-users with the ability to control how much streaming video content is desired to be purchased, each of the producers of streaming video content are incentivized to provide quality video content for viewing. Otherwise, very little of the produced video content will be purchased for viewing.

An end-user that desires to view streaming video content through the streaming video content control system according to embodiments of present inventive concept is required to first obtain a membership account with the system. The membership account, however, does not require a fee to join.

Process steps of: a) obtaining a membership with the host's streaming video content control system; b) providing currency to an account of the host's streaming video content control system; and c) viewing the desired amount of streaming video content provided by the host's streaming video content control system are described in detail below with reference to FIG. 1 through FIG. 12.

FIG. 1 illustrates an introductory user interface generated by the server of the streaming video content control system according to example embodiments of the present inventive concept. This generated introductory user interface screen is configured to be displayable on an end-user's touch-screen via the user interface generated by the system when the end-user accesses the system's website that provides access to the streaming video content control system according to example embodiments of the present inventive concept. This website can be instantly accessed to present the introductory interface screen by tapping on the system's "app," which can be obtained via the internet or can be downloaded via an app on the end-user's mobile device that provides for end-users to search for apps, such as, for example the App Store© by Apple®.

As illustrated in FIG. 1, an end-user's "user name" and "password" can be requested by the introductory interface screen. If an end-user has not yet established a "user name" and "password," and therefore does not yet have a membership, the end-user can also be provided with the opportunity to start an account by tapping a highlighted "sign up" virtual indicator button displayed on the same introductory interface screen (see FIG. 1).

Figure 2:
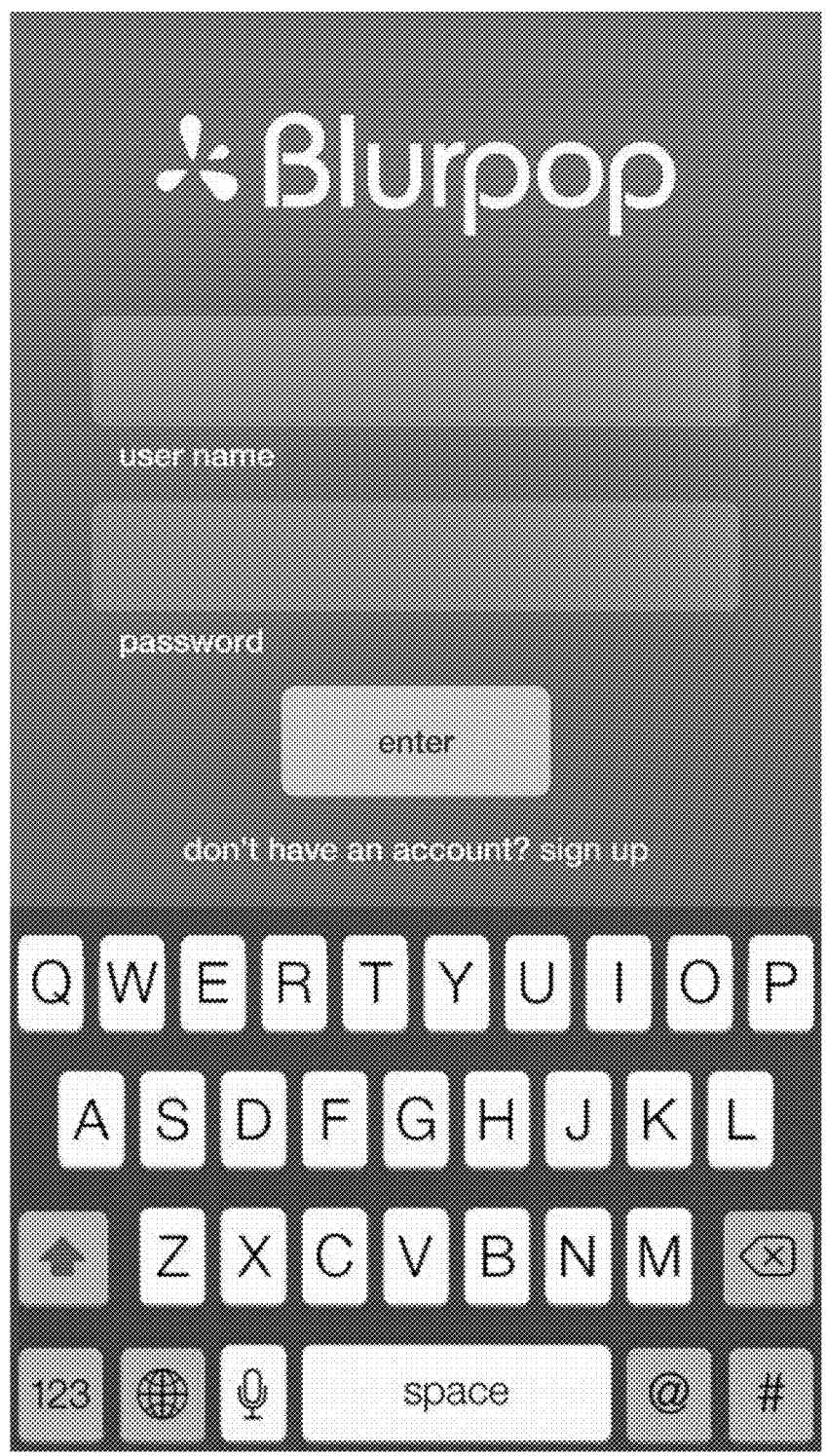
FIG. 2 illustrates an interface screen including the interface screen of FIG. 1 together with a virtual keyboard for entry of information to sign up or obtain an account with the streaming video content control system according to exemplary embodiments of the present inventive concept.

As illustrated in FIG. 2, a virtual keyboard appears below the same introductory interface screen as illustrated in FIG. 1 as a result of the end-user touching a location on the interface screen of FIG. 1 in which text or numbers are to be entered. Otherwise, if the end-user touches the highlighted "sign-up" indicator button, an interface screen illustrated in FIG. 3 appears, where the end-user can then obtain a new membership account by entering all required information to secure an account, including a form of payment used to pay to view increments of streaming video content. In this example, credit card information is requested from the end-user, however the interface screen of FIG. 3 can also generate a field in which payment information for other forms of payment can be entered, such as, for example a PayPal® account number, etc.

Figure 3:
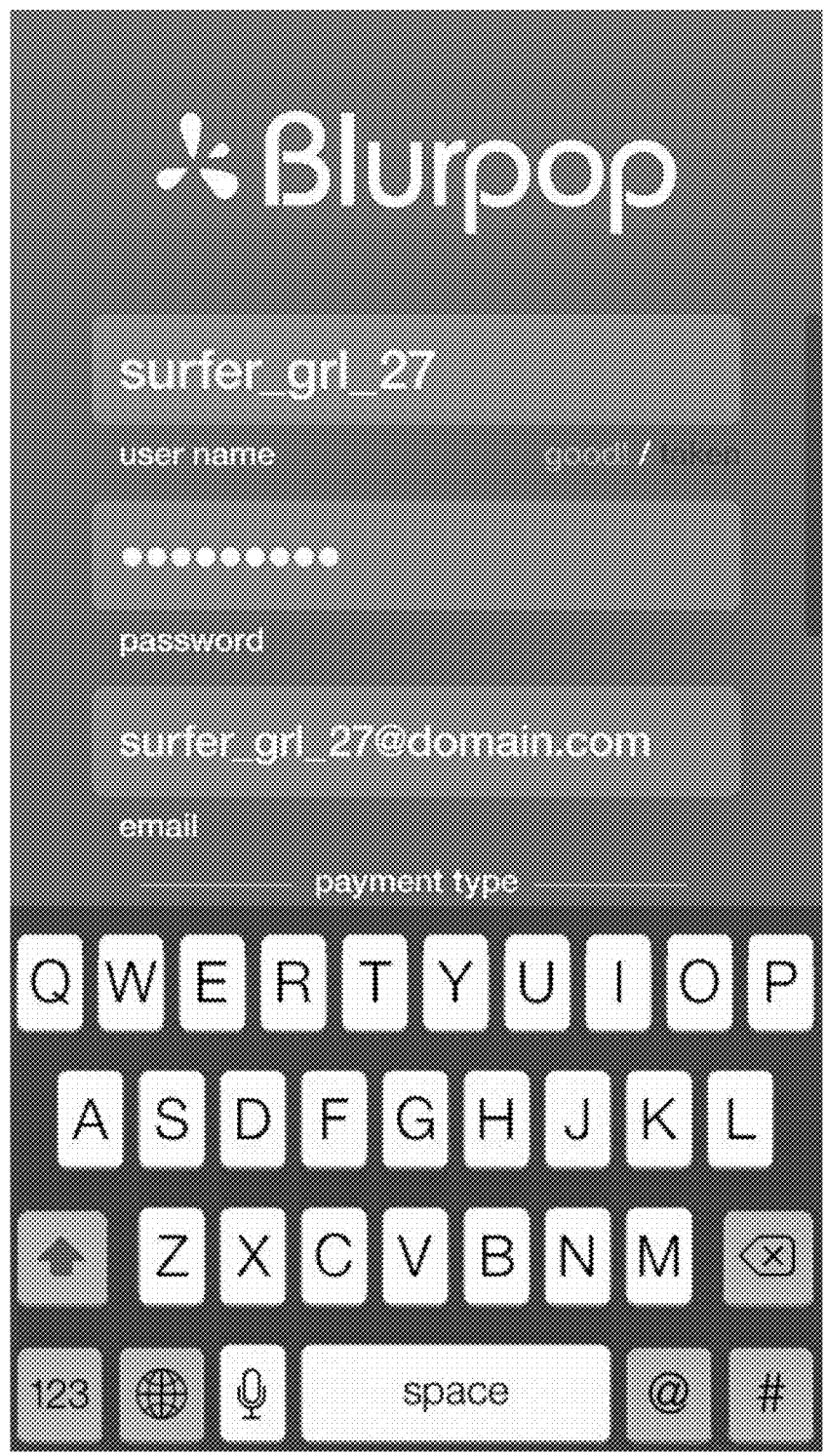
FIG. 3 illustrates an interface screen illustrating information required to obtain an account with the streaming video content control system according to exemplary embodiments of the present inventive concept.
Figure 4:
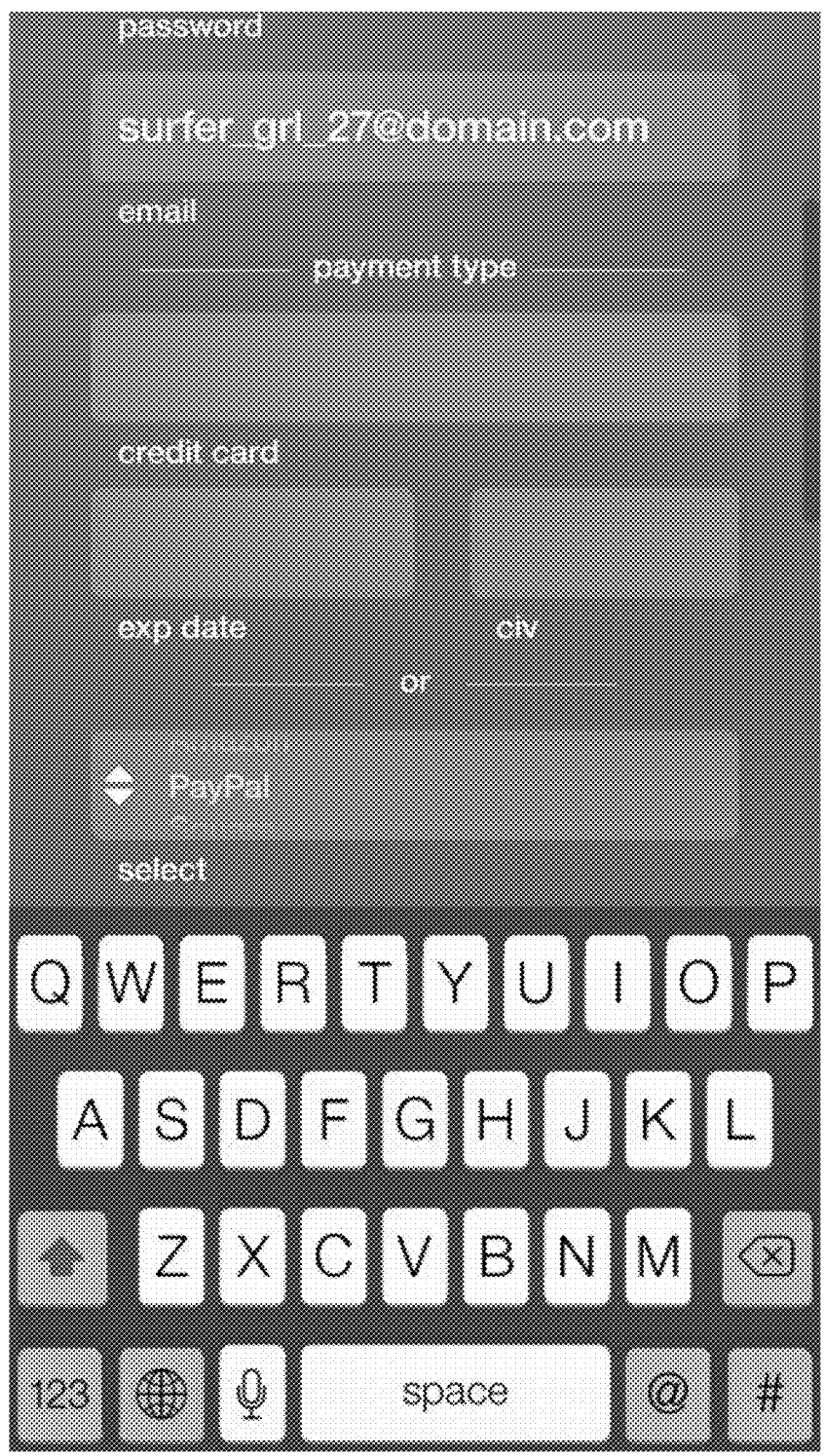
FIG. 4 illustrates an interface screen including the interface screen illustrate in FIG. 3 together with a virtual keyboard to enter information required to obtain an account with the streaming video content control system according to exemplary embodiments of the present inventive concept.

Similar to the screen in FIG. 2, when the end-user touches an area of the interface screen as illustrated in FIG. 3 to enter text or numbers into the required fields, another screen is presented which includes the same interface screen of FIG. 3 as well as a virtual keyboard for entering text and/or numbers into the required fields, as illustrated in FIG. 4. The field where a user name is required can automatically indicate whether the user name entered is original (not used by another member) with the indicator "good!", or can indicate whether the user name is already being used with the indicator "taken". However, these indicators can be presented in other forms which provide the intended purposes of the present inventive concept as described herein.

Figure 5:
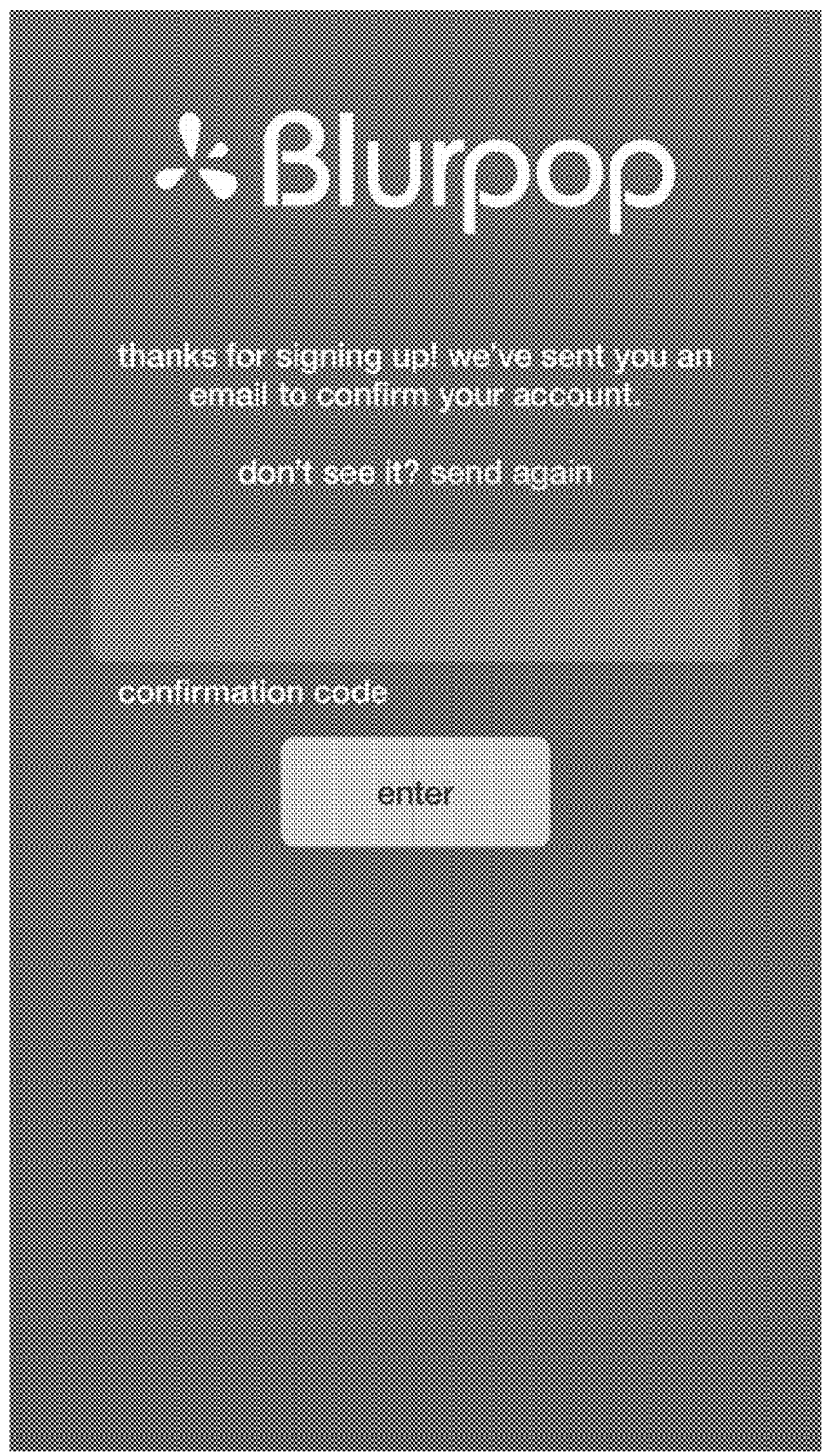
FIG. 5 illustrates an interface screen confirming a new account with the streaming video content control system for the user, according to exemplary embodiments of the present inventive concept.
Figure 6:
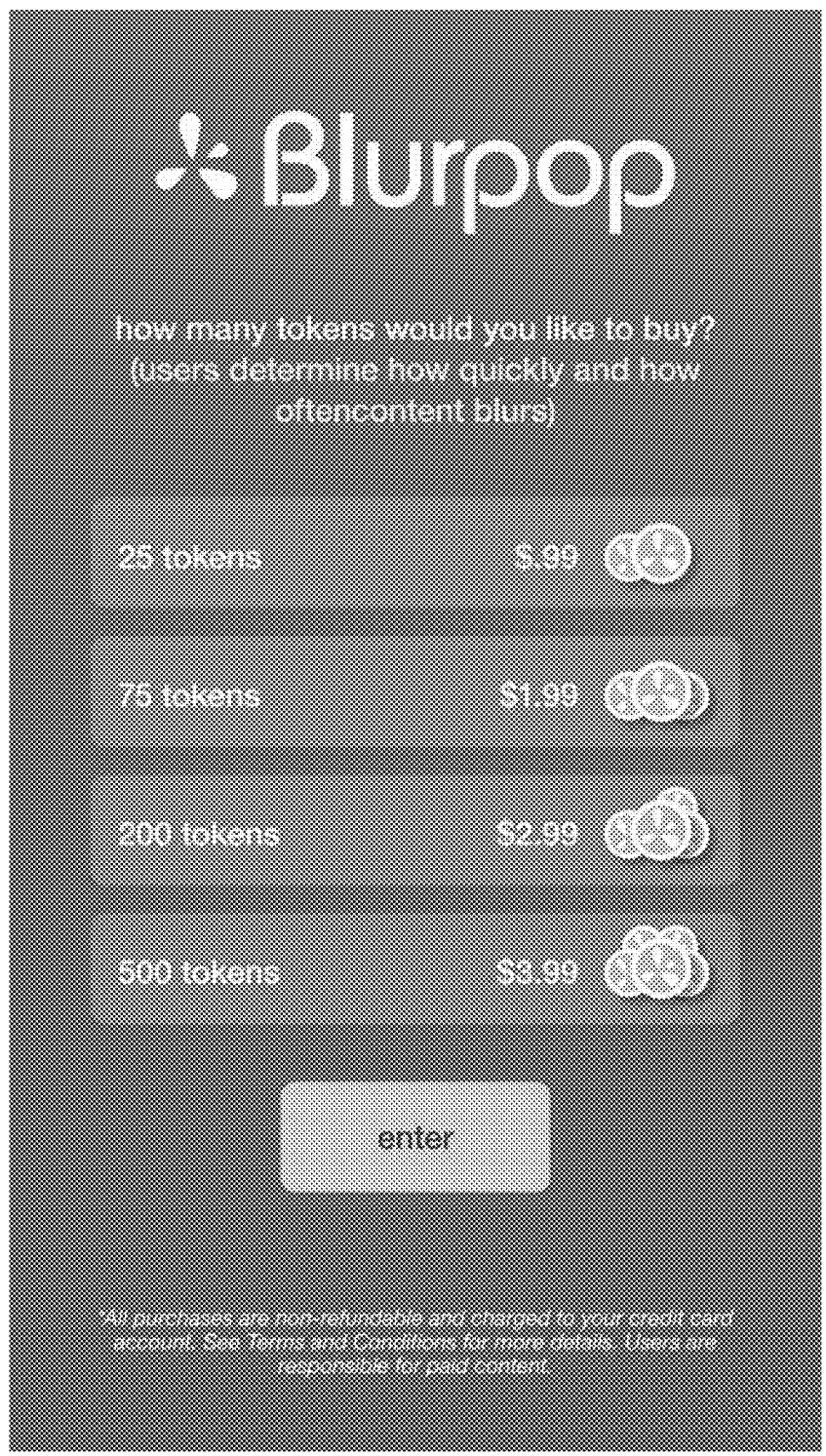
FIG. 6 illustrates an interface screen to choose a number of tokens a user desires to purchase to stream video content over the streaming video content control system, according to exemplary embodiments of the present inventive concept.

As a result of the end-user successfully registering and obtaining a membership account with the streaming video content control system according to embodiments of the present inventive concept, a generated confirmation user interface can be presented, as illustrated in FIG. 5. The generated confirmation user interface confirms that the user has successfully obtained a membership account with the streaming video content control system, and provides a field in which the user can enter a confirmation code that is sent to the user's email address provided by the user in the previous interface screen illustrated in FIG. 4. As a result of the user entering the received confirmation code in the confirmation code field, a generated token user interface is presented, as illustrated in FIG. 6. If the user does not receive an email including a confirmation code, then the user can request a confirmation code be sent again by tapping the highlighted "send again" virtual button illustrated in FIG. 5.

In the token interface of FIG. 6, several options can be presented to decide how many tokens the end-user desires to purchase in order to begin viewing a desired live streaming video content among a plurality of available streaming video content. The cost for the number of tokens the end-user chooses to purchase can be deducted from the credit card or other currency account that the end-user previously entered into the user interface illustrated in FIG. 4. As pointed out above, the end-user can choose how many tokens to purchase for viewing the desired streaming video content by selecting one of the virtual buttons displayed in the user interface illustrated in FIG. 6. According to other example embodiments, alternative forms of currency can be used in place of tokens to purchase increments of streaming video content, such as, for example bit coins, other types of credit, alternative virtual currency, etc.

FIG. 6 illustrates an example where four options for choosing how many tokens can be purchased per transaction, including a first option offering 25 tokens at a price of $0.99, a second option offering 75 tokens at a price of $1.99, a third option offering 200 tokens at a price of $2.99, and a fourth option offering 500 tokens at a price of $3.99. Although four options are illustrated to choose the number of tokens desired to be purchased, the number of options for choosing how many tokens a user may purchase can be changed by the host at a server of the streaming video content control system to any number of options, and the cost per number of tokens can also be changed to any amount the host decides to charge.

In addition to determining the number of options for choosing how many tokens a user may purchase and the cost per number of tokens, the server of the streaming video content control system according to an embodiment of the present inventive concept (or the producer of the streaming video content) can also decide how many tokens are used per viewable increment of time before the streaming video content becomes non-viewable. More specifically, the streaming video content on the end-user's smart electronic device screen becomes non-viewable as a result of the passage of a predetermined incremental amount of time that was purchased with a token(s) (as pointed out above, the host determines the number of tokens required for a set time period of viewing the streaming video content). In other words, the server of the streaming video content control system, or the producer of the streaming video content can decide ahead of time how quickly the video streaming content becomes non-viewable per number of tokens used, and therefore the host of the system (or producer of streaming video) can also determine how long of an increment of streaming video content the end-user can view before being required to spend more pre-purchased tokens to repeal the non-viewable state of the streaming video content on the end-user's screen, as will be described in detail below. As a result of the streaming video content becoming non-viewable, more tokens are required in order to continue viewing the streaming video content. The end-user can therefore decide whether to continue viewing the presently streaming video content on the screen, whether to switch to a different streaming video content, or whether to stop viewing all streaming video content provided by the streaming video content control system of the present inventive concept, with cost efficiency. As pointed out above, the server of the streaming video content control system can configure the streaming video content to become non-viewable by obscuring the video content with a commercial or other material being displayed over the streaming video content or by blurring the streaming video content. The server can also cause the audio to fade out or be changed to audio corresponding to the obscuring material.

If the end-user decides to continue viewing the same streaming video content on the screen of the smart electronic device, the end-user can repeal the non-viewable state on the screen, for example, by merely interacting with the screen with a tap, a swipe, using a remote control, using voice activated control, etc.. Each time the streaming video content becomes non-viewable, the end-user can simply interact with the screen to instantly repeal the non-viewable state and continue viewing the streaming video content on the screen.

Figure 7:
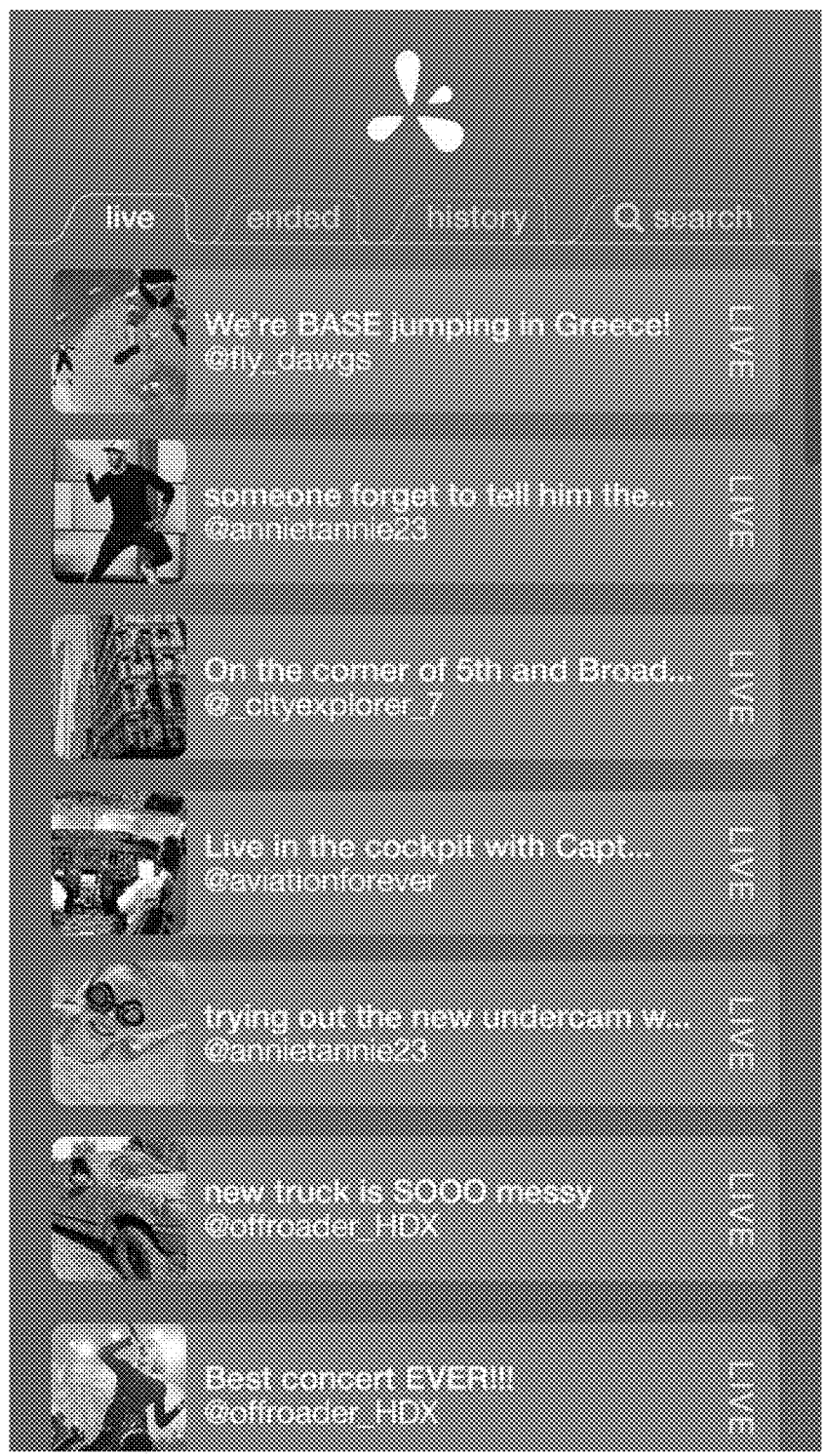
FIG. 7 illustrates an interface screen that displays a plurality of options a user can choose from to begin viewing desired streaming video content using the streaming video content control system, according to exemplary embodiments of the present inventive concept.

FIG. 7 illustrates a plurality of streaming videos from which a user can choose via the interface provided by the streaming video content control system of the present inventive concept. The user can view even more streaming videos choices by scrolling down on the interface screen illustrated in FIG. 7. On a touchscreen of the end-user's mobile device, for example, the end-user can scroll down by swiping downward on the screen of the mobile device. Similarly, the user can scroll up on the interface screen by swiping upward on the screen of the mobile device. Alternatively, if using a smart TV or other remote controlled device, the user can scroll up and down via the remote control or voice activated controls. The content control system can provide the user with the ability to view all available streams filtered and sorted by date, popularity, category and using a search tab as illustrated, based on keywords. However, the user interface generated by the server of the system can provide the end-user with the ability to view all available streams of video content according to any form of organization desired. In addition, a tab labeled "history" allows the end-user to view a history of previously selected streaming video content, and an "ended" tab illustrates available streaming video content that are not live, but are previously stored streaming video content.

Figure 8:
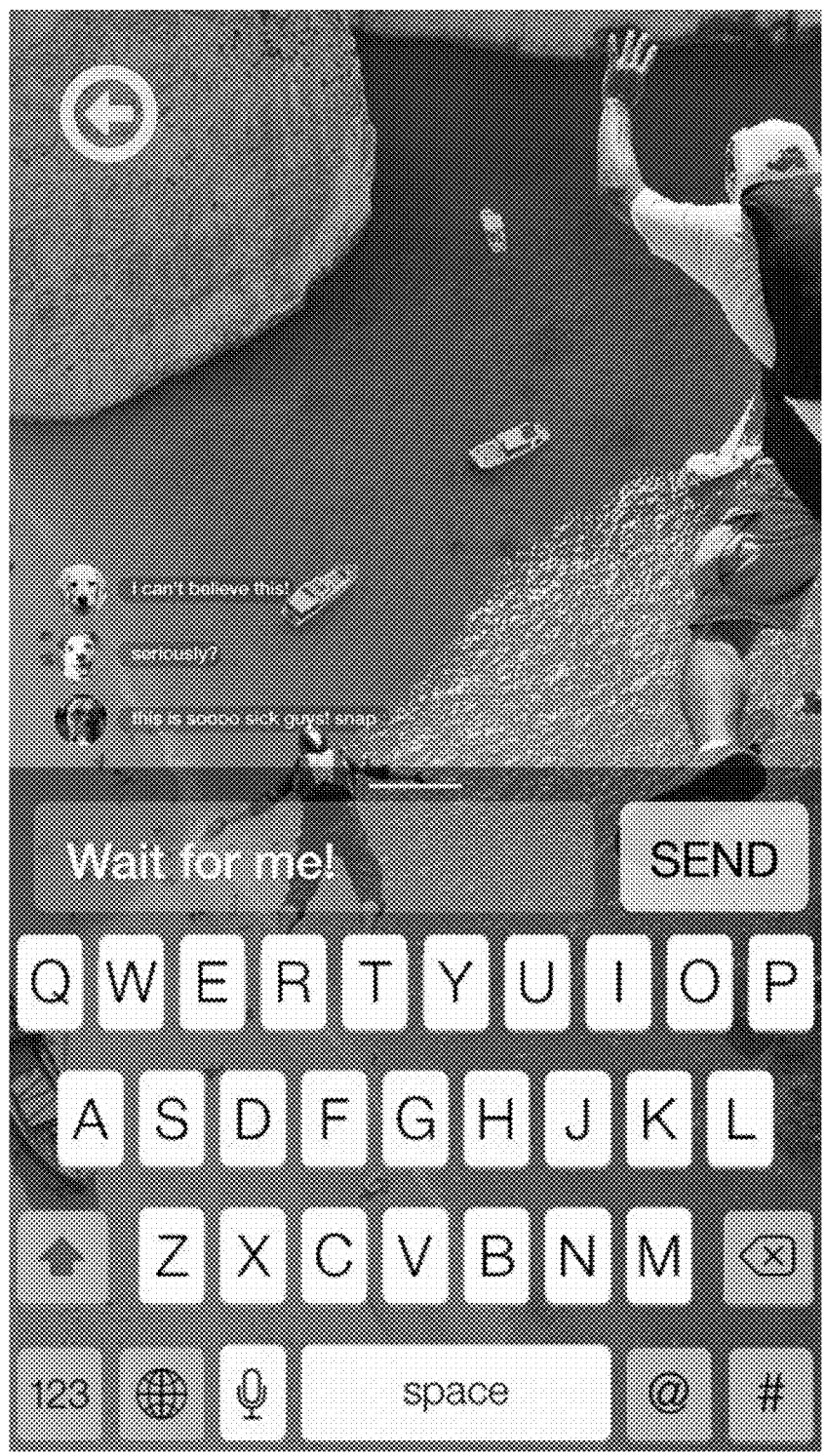
FIG. 8 illustrates viewing the first live streaming video content displayed in FIG. 7 using the streaming video content control system, according to exemplary embodiments of the present inventive concept.
Figure 9:
FIG. 9 illustrates a blurred version of the first live streaming video content displayed in FIG. 8 using the streaming video content control system, according to exemplary embodiments of the present inventive concept.

FIG. 8 illustrates a full view of the first live streaming video content selectable to be viewed in FIG. 7, which in this case appears on the interface screen as a result of the user choosing this live streaming video content by tapping on this choice among the many choices provided by the user interface illustrated in FIG. 7. Because the user has already purchased a number of tokens to view this live streaming video content, the streaming video can be originally presented in a viewable state while a predetermined number of tokens are initially deducted from the user's account. However, after the predetermined increment of time passes (preset by the host of the streaming video content control system according to the present inventive concept or as set on a control interface by a producer of the streaming video content (see FIG. 11)), this streaming video content becomes non-viewable (i.e., blurred or obscured), as illustrated in FIG. 9. In addition to the non-viewable state, a message can be generated on the user interface which notifies the user to interact with the screen to repeal the non-viewable state and continue viewing the streaming video content for another predetermined increment of time, such presenting text stating "tap to see more," also illustrated in FIG. 9.

Figure 10:
FIG. 10 illustrates an indictor over streaming video content on a touch-screen to return to a main menu, according to another example embodiment of the present inventive concept.

Referring to FIG. 10, the user interface presenting the streaming video content can provide an indicator on the screen for the end-user to, for example swipe the touchscreen in a particular direction, such as to the left, in order to return to a main menu. However, alternative indicators can be generated by the server on the user interface to indicate how to return to the main menu, which also results in the deducting of tokens from the end-user's account to be terminated as well as the viewable state of the streaming video content. Such alternative indicators can include, but are not limited to, a button 1001 with padding around it (an in-active area) to provide a large area in which the touching is sensed to return to the main menu, thus reducing the chances of touching a part of the screen that will inadvertently be sensed as deducting more tokens and providing more viewable streaming video content.

Figure 11:
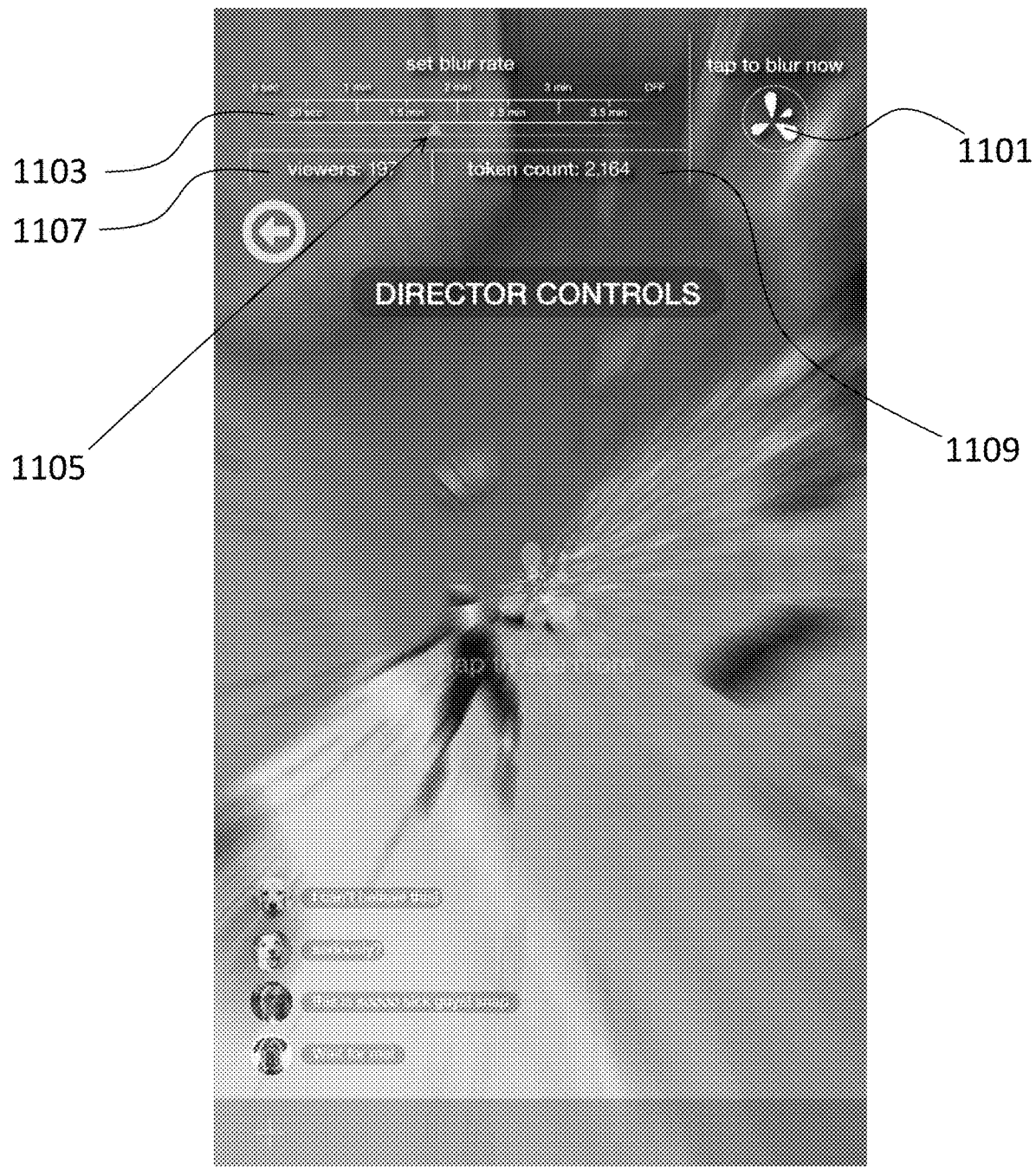
FIG. 11, illustrates a control interface for a streaming video content producer to control a viewable status of the streaming video content according to an example embodiment of the present inventive concept.

Referring to FIG. 11, according to another example embodiment, as described above, the streaming video content control system can be configured to display a control interface at the producer's end which allows the producer of the streaming video content to render the streaming video non-viewable on demand, while stopping the charge to the user's account (i.e., stop collecting tokens), and require acceptance by the end-user to be charged a higher amount of currency per increment to repeal the non-viewable state. This feature can be provided in the form of a virtual button 1101 together with text stating "tap to blur now" at a predetermined location on the control interface. For example, if the streaming video is leading up to a big event, the producer can blur the video by touching the button 1101 on the control interface, thus requiring the end-user to agree to spend a different amount of tokens to view the big event. In alternative embodiments, the feature to render the streaming video content non-viewable by the producer can be in the form of a virtual switch, or another type of user interface feature that can be interacted with, other than a virtual button.

Moreover, the control interface can also be configured to display a time graph 1103 to allow the producer to set the non-viewable rate to re-occur after a desired amount of time. The producer can swipe an indicator 1105 across the time graph 1103 to choose the desired time. The control interface can also be configured to display the number of viewers (end-users) 1107 viewing the streaming video as well as the number of tokens 1109 being received by in exchange for viewing the streaming video content produced.

As described above, the streaming video content available to end-users to view in exchange for tokens (or other currency) can be pre-recorded videos as well as live videos, as previously illustrated with the "ended" tab in FIG. 7. The pre-recorded videos can be available for selection simply by selecting the "ended" tab on the user interface provided by the streaming video content control system of the present inventive concept.

Accordingly, it is to be understood that the embodiments of the present inventive concept herein described are merely illustrative of the application of the principles of the present inventive concept. Reference herein to details of the illustrated embodiments is not intended to limit the scope of the claims, which themselves recite those features regarded as essential to the present inventive concept.

What is claimed is:

1. A system to monetize increments of streaming video content for selectively viewing desired increments of the streaming video content on an interactive screen of a smart electronic device, comprising:
    a user interface configured to be accessible by smart electronic devices through a network for viewing streaming video content and to receive an input through smart electronic devices accessing the user interface; and
    a server configured to provide a requested number of tokens in exchange for currency with users of each smart electronic device through the accessed user interface, to provide the streaming video content through the user interface in a non-viewable state including a message to notify a user to interact with the screen to repeal the non-viewable state, and to repeal the non-viewable state of the streaming video content, in response to an input entered at any desired time at the interactive screen, for each smart electronic device accessing the user interface, for an increment of time in exchange for a token purchased at the accessing smart electronic device, the repealing of the non-viewable state of the streaming video content for the increment of time being restarted each time the input is received by the user interface through the interactive screen of the corresponding accessing smart electronic device.

2. The system according to claim 1, wherein the input received through each smart electronic device to restart the repealing of the non-viewable state is a tap on the respective interactive screen.

3. The system according to claim 1, wherein the input received through each smart electronic device to restart the repealing of the non-viewable state is a swipe on the respective interactive screen.

4. The system according to claim 1, wherein the input received through the smart electronic device to restart the repealing of the non-viewable state is one of either a click received from a remote control device of an accessing smart electronic device or a voice received by a voice sensor at an accessing smart electronic device.

5. The system according to claim 1, wherein the non-viewable state is a blurred state.

6. The system according to claim 1, wherein the non-viewable state is an obscured state.

7. The system according to claim 1, wherein the network is wireless.

8. The system according to claim 1, where the smart device is a mobile device.

9. The system according to claim 1, wherein the server is further configured to:
    generate a service screen on the user interface which the user can select to view and enter data via the interactive screen of the smart electronic device to purchase a desired number of tokens usable to repeal the blurring of the accessed streaming video content; and
    generate a virtual keyboard with the service interface when the service screen is tapped to enter the data.

10. The system according to claim 9, wherein the server is further configured to generate a token screen selectable on the user interface, the token screen including a plurality of touch icons each providing a different number of tokens that can be selected by the user in exchange for a predetermined amount of currency.

11. The system according to claim 9, wherein the server is further configured to:
    generate a membership screen which the user can select to view and enter membership data, the data enterable including personal identification (ID) data and credit card data required to purchase the tokens; and
    display the virtual keyboard with the membership screen when the membership screen is tapped, the keyboard usable to enter the ID and credit card data.

12. A method of monetizing increments of streaming video content for selectively viewing desired increments of the streaming video content on an interactive screen of a smart electronic device, the method comprising:
    generating a user interface configured to be accessible by a smart electronic device through a network for viewing streaming video content and to receive an input through a smart electronic device accessing the user interface; and
    streaming video content through the user interface in a non-viewable state including a message to notify a user to interact with the screen to repeal the non-viewable state;
    repealing the non-viewable state of the streaming video content at any desired time by the user of each smart electronic device accessing the user interface, for an increment of time in exchange for a token received from each smart electronic device accessing the user interface as a result of an input received at the user interface from the corresponding interactive screen.

13. The method according to claim 12, wherein the input at the interactive screen is a tapping of the interactive screen.

14. The method according to claim 12, wherein the input at the screen is a swiping across the interactive screen.

15. The method according to claim 12, wherein the input at the screen is either an input received wirelessly from a button on a remote device or a voice sensed via a voice sensor at a smart electronic device.

16. The method according to claim 12, wherein the non-viewable state is a blurred state.

17. The method according to claim 12, wherein the non-viewable state is an obscured state.

18. The method according to claim 12, wherein the smart device is a mobile device.

19. The method according to claim 12, wherein the network is a wireless network.

20. The method according to claim 12, further comprising:
    generating a service screen on the user interface selectable by the user to view and enter information through the screen of the smart device to purchase a desired number of tokens usable to repeal the non-viewable state of the accessed streaming video content; and generating a virtual keyboard with the service screen when the service screen is interacted with to enter the information.

21. The method according to claim 20, further comprising:

generating a token screen selectable on the user interface, the token screen including a plurality of icons each providing a different number of tokens that can be selected by the user in exchange for a predetermined amount of currency.

22. The method according to claim 20, further comprising:

generating a membership screen selectable by the user to view and enter data through the interactive screen, the data enterable including personal identification (ID) data and financial account data required to purchase the tokens; and displaying the virtual keyboard with the membership screen when the membership screen is interacted with, the keyboard usable to enter the ID and financial account data.

23. The method according to claim 12, wherein the deducting of tokens from the user's account terminates and the streaming video content being viewed becomes non-viewable when a tap or a swipe of the interactive screen is detected.

24. A streaming video content control system, comprising:

a user interface configured to be accessible by a smart electronic device through a network for selectively viewing desired increments of streaming video content and to receive an input at the user interface through an interactive screen at a smart electronic device accessing the user interface; and a server configured to generate a set of interface windows through the user interface to allow a user at a smart electronic device accessing the user interface to open an account with the streaming video content control system, to deposit currency in the opened account from a financial account of the user, to dedicate a number of tokens to the user based on the amount of deposited currency, to stream video content through the user interface in a non-viewable state including a message to notify the user to interact with the screen to repeal the non-viewable state, to deduct a token from the user's opened account each time the user interacts with the screen to repeal the non-viewable state, and to provide the requested increment of streaming video content in a viewable state to the smart electronic device in which the interaction has occurred.

25. The system according to claim 24, wherein the server controls the amount of streaming video content to be viewed by providing the viewable state of the streaming video content through the user interface for increments of time corresponding to a number of tokens selected at the user interface to be deducted from the open account each time a request is input at the interactive screen of the smart electronic device, the server providing the streaming video content in the viewable state each time the request to view the steaming video content is input at the user interface.

26. The system according to claim 25, wherein the server renders the streaming video content to be non-viewable by blurring the video content.

27. The system according to claim 25, wherein the server renders the streaming video content to be non-viewable by obscuring the video content.

28. The system according to claim 27, wherein the server obscures the streaming video content by placing an advertisement over the video content.

29. The system according to claim 25, wherein the server repeals the non-viewable state of the streaming video content as a result of the server sensing a tap on a touch-screen of the smart electronic device.

30. The system according to claim 24, wherein the server detects the input request to view an increment of streaming video content by sensing when the screen is touched.

31. The system according to claim 24, wherein the server detects the input request to view an increment of streaming video content by sensing when the screen is swiped.

32. The system according to claim 24, wherein the server generates an indicator at a predetermined location over the streaming video content for termination of the streaming video content.

33. The system according to claim 32, wherein the server terminates the deducting of tokens from the user's account and blurs the streaming video content being viewed when the indicator is engaged.

34. The system according to claim 33, wherein the indicator is a prompt to swipe across the interactive screen.

35. The system according to claim 33, wherein the indicator is a prompt to touch the indicator.

\* \* \* \* \*